United States Patent [19]

Miyaji

[11] Patent Number: 5,466,321
[45] Date of Patent: Nov. 14, 1995

[54] METHOD OF AND APPARATUS FOR SUPERPOSING STRIP MEMBERS

[75] Inventor: Hiroshi Miyaji, Higashi-Osaka, Japan

[73] Assignee: Sanki Machinery Co., Ltd., Osaka, Japan

[21] Appl. No.: 168,188

[22] Filed: Dec. 17, 1993

[51] Int. Cl.$^6$ ............................ B32B 31/04; B32B 31/18; B32B 35/00
[52] U.S. Cl. ................... 156/260; 156/152; 156/248; 156/249; 156/270; 156/271; 156/344; 156/512; 156/540; 156/543; 156/584; 270/52
[58] Field of Search ................... 156/249, 260, 156/264, 271, 512, 152, 248, 344, 584, 270, 540, 543; 270/52, 52.5, 58

[56] References Cited

U.S. PATENT DOCUMENTS

| | | | |
|---|---|---|---|
| 265,556 | 10/1882 | Anthony et al. | 270/52 |
| 316,120 | 4/1885 | Crowell | 270/52 |
| 818,655 | 4/1906 | Balze | 270/52 |
| 3,399,884 | 9/1968 | Bahrani | 270/52 |
| 3,655,475 | 4/1972 | Stelling Jr. et al. | 156/260 X |
| 3,734,487 | 5/1973 | Treff | 156/572 X |
| 3,744,383 | 7/1973 | Finch et al. | 156/264 X |
| 4,760,764 | 8/1988 | De Jonckleere et al. | 156/264 X |
| 5,021,110 | 6/1991 | Kobayashi . | |
| 5,048,810 | 9/1991 | Palmatier et al. | 270/52 |

Primary Examiner—David A. Simmons
Assistant Examiner—M. Curtis Mayes

[57] ABSTRACT

The method of superposing a strip member pertaining to the present invention including the steps of conveying first and second strip members arranged in two rows and side by side in the widthwise direction thereof in parallel to each other, from an upstream side toward a downstream side in the longitudinal direction thereof, looping either the first or the second strip member in a manner to describe a spiral whose axis extends in a direction intersecting the longitudinal direction of the strip member to be looped and thereby delivering the looped strip member to the row of the other strip member, and superposing the first and second strip members thus rearranged into a single row so as to be integrated. In the case of applying this superposing method to the manufacture of multilayered labels, there are used first and second label papers each having a large number of label messages printed on the surface thereof and arranged in the longitudinal direction thereof, as the first and second strip members, respectively, and a release paper is affixed releasably to the reverse surface of at least the second label paper. According to this method, two rows of strip members can be rearranged into a single row in an extremely simple manner and in an instant. Consequently, the manufacturing line for multilayered labels or the like can be greatly reduced in scale, whereby the equipment cost and running cost can be kept to a minimum.

11 Claims, 7 Drawing Sheets

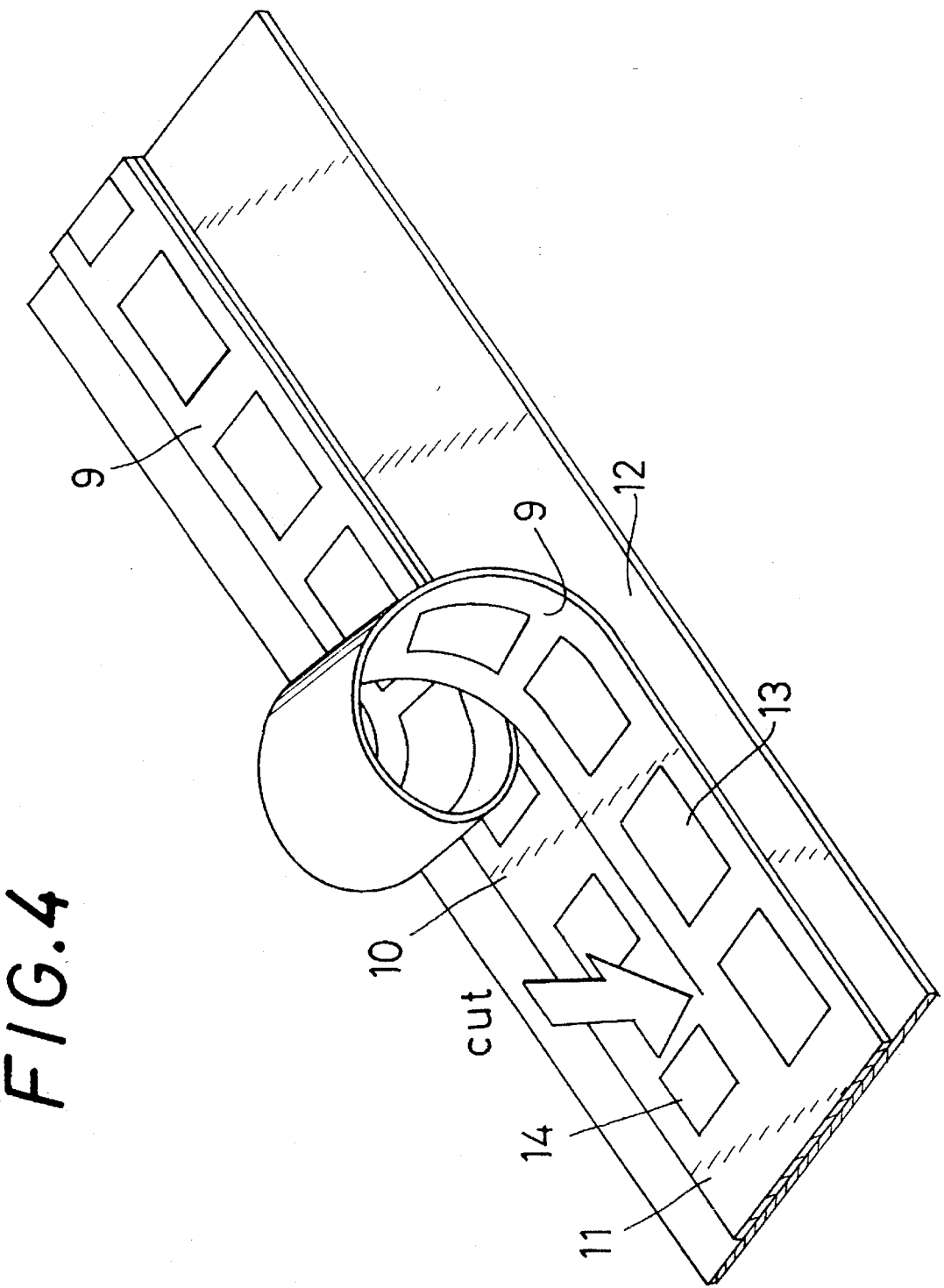

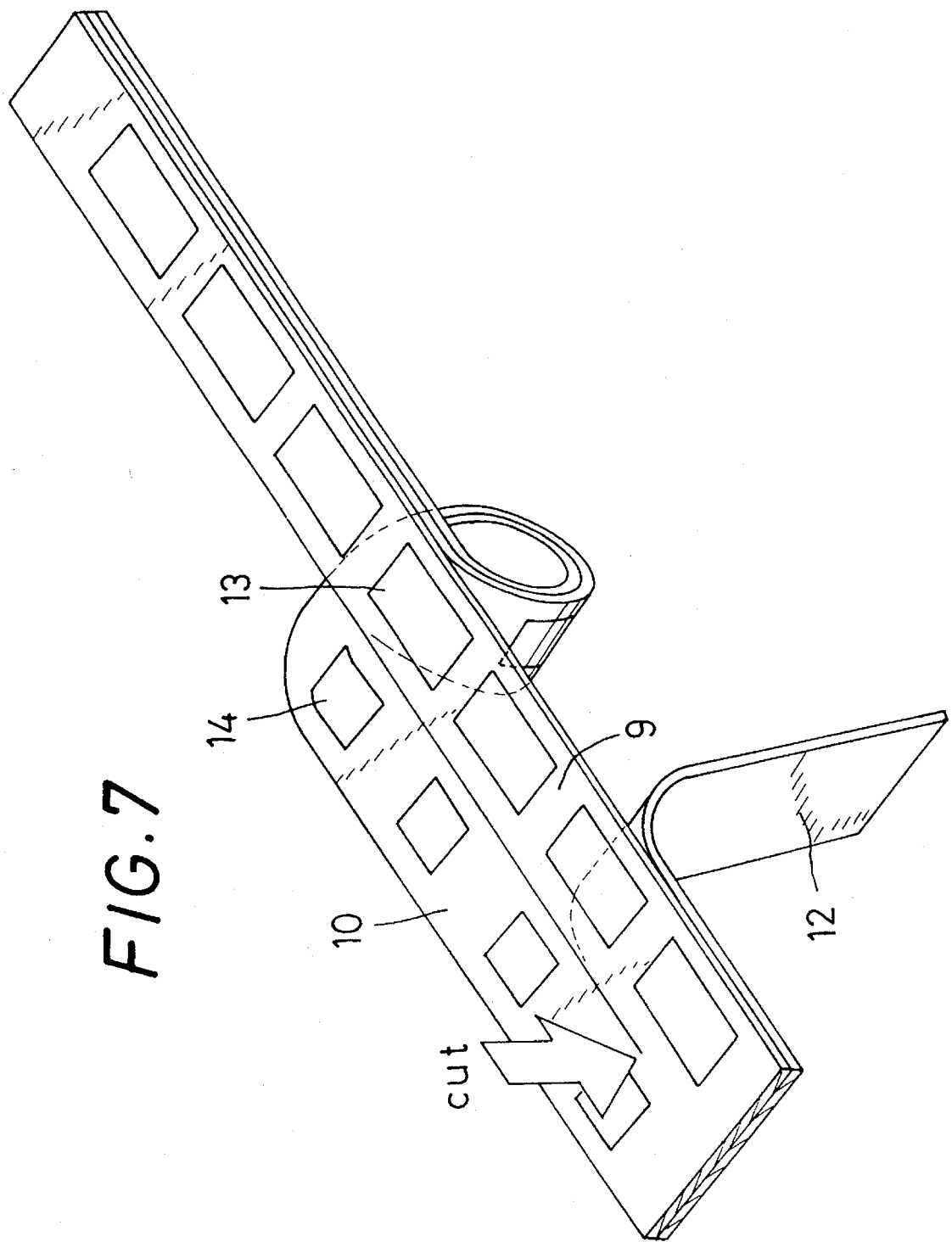

METHOD OF AND APPARATUS FOR SUPERPOSING STRIP MEMBERS

FIELD OF THE INVENTION AND RELATED STATEMENT

The present invention relates to a method of and an apparatus for superposing strip members comprising a label paper or the like.

Heretofore, as an example of a label having a message such as trade name, trademark, pattern or the like printed on the surface thereof, there has been used a multilayered label comprising two labels provided in a double-layer form on a release paper. As a method of producing such multilayered label there has been known the method disclosed in U.S. Pat. No. 5,021,110 (Kobayashi).

According to the patent to Kobayashi, from a single printing machine there are delivered first and second label papers while being arranged in two rows in the widthwise direction, then the traveling course of the second label paper, which has a release paper, is corrected gradually so as to approach the row of the first label paper not having a release paper until both label papers are finally arranged in a single row, and thereafter the first label paper is superposed on the second label paper.

As such means for correcting the course of the second label paper in the above patent there are used a large number of correction rolls arranged in the conveyance direction of the same label paper and whose axis are inclined little by little toward the first label paper row. Through these correction rolls the traveling course of the second label paper is corrected toward to the first label paper row while being tilted like the bank in a car race.

In the use of such traveling course correcting means, however, since it is necessary to arrange a large number of correction rolls on the paper conveying line, the equipment cost for the apparatus is high and the adjustment of the correction rolls is difficult; besides, the running cost is high because the equipment itself becomes large and long.

OBJECT AND SUMMARY OF THE INVENTION

The present invention has been accomplished in view of the above-mentioned circumstances and it is the object of the invention to provide a method of and an apparatus for superposing strip members capable of transferring one strip member (e.g. label paper) to a row of the other strip member in an extremely simple manner.

In order to achieve the said object, the present invention adopts the following technical means.

The method of superposing strip members pertinent to the present invention comprises the steps of:

conveying first and second strip members arranged in two rows and side by side in the widthwise direction in parallel to each other, from an upstream side toward a downstream side in the longitudinal direction thereof;

looping either the first or the second strip member in a manner to describe a spiral whose axis extends in a direction intersecting the longitudinal direction of the strip member to be looped, thereby delivering the looped strip member to the row of the other strip member; and superposing the first and second strip members thus rearranged into a single row.

In the case where this superposing method is applied to the manufacture of the foregoing multilayered labels, the first strip member corresponds to the first label paper having printed on the surface thereof a large number of label messages arranged in the longitudinal direction thereof and the second strip member corresponds to the second label paper having printed on the surface thereof a large number of labels arranged in the longitudinal direction, and a release paper is stuck releasably on the underside of at least the second label paper.

The superposing method of the invention involves the case where the first label paper is looped and the case of looping the second label paper. In the former case, the looping operation is performed on the surface side of both label papers, while in the latter case, the looping operation is performed on the reverse side. This is because it is necessary that, after the looping, the first label paper be sure to be positioned on the surface side of the second label paper with release paper.

The apparatus for superposing strip members pertinent to the present invention is provided with:

a conveyor for conveying first and second strip members arranged in two rows and side by side in the widthwise direction in parallel to each other, from an upstream side toward a downstream side in the longitudinal direction thereof;

a transfer means for looping either the first or the second strip member in a manner to describe a spiral whose axis extends in a direction intersecting the longitudinal direction of the strip member to be looped, thereby delivering the looped strip member to the row of the other strip member; and an adhering means for superposing the first and second strip members which are rearranged into a single row by the transfer means.

The transfer means has a winding rod whose axis extends in a direction perpendicular to the above longitudinal direction, and the first or the second strip member is wound spirally round the peripheral surface of the winding rod.

In the case of applying this superposing apparatus to a multilayered label manufacturing system, a first label paper having printed on the surface thereof a large number of label messages arranged in the longitudinal direction thereof is adopted as the first strip member, while a second label paper having printed on the surface thereof a large number of label messages arranged in the longitudinal direction thereof is adopted as the second strip member.

In this superposing apparatus, in the case of winding the first label paper around the winding rod, the winding rod is disposed on the surface side of both label papers, while in the case of winding the second label paper with release paper around the winding rod, the winding rod is disposed on the reverse side of both label papers. This is for the same reason as that mentioned in the foregoing superposing method.

According to the present invention summarized above, since one of the strip members is looped in a manner to describe a spiral whose axis extends in a direction intersecting the longitudinal direction of the strip member to be looped and is thereby delivered to the row of the other strip member, the two strip member rows can be rearranged into a single row in an extremely simple manner and in an instant without using even one correction roll which has heretofore been required. Consequently, the multilayered label manufacturing line can be made much smaller in scale than in the prior art, whereby the equipment cost and the running cost can be kept to a minimum.

It is not limited to the manufacture of multilayered labels that the method of and apparatus for superposing strip members pertinent to the invention are applied. For example, the present invention is also applicable to the case where labels are to be affixed releasably onto sheet-like articles having messages for information transfer and incapable of being stuck on other goods, such as pamphlets or cards.

In this case, the foregoing label paper will be adopted as the first strip member, while a band-like member having printed thereon a large number of such sheet-like articles will be adopted as the second strip member. As a matter of course, it is not necessary in this case to attach the foregoing release paper to the second strip member. This is because pamphlets and cards are not for being affixed to other goods.

BRIEF DESCRIPTION OF THE DRAWINGS

in FIG. 2;

FIG. 4 is a perspective view showing a method of superposing label papers;

FIG. 7 is a perspective view showing a still further method of superposing label papers.

DETAILED DESCRIPTION OF THE PREFERRED EMBODIMENTS

Preferred embodiments of the present invention will be described hereinunder with reference to the accompanying drawings.

FIGS. 1 to 5 illustrate a first embodiment of the method of and apparatus for the present invention.

Figure 1:
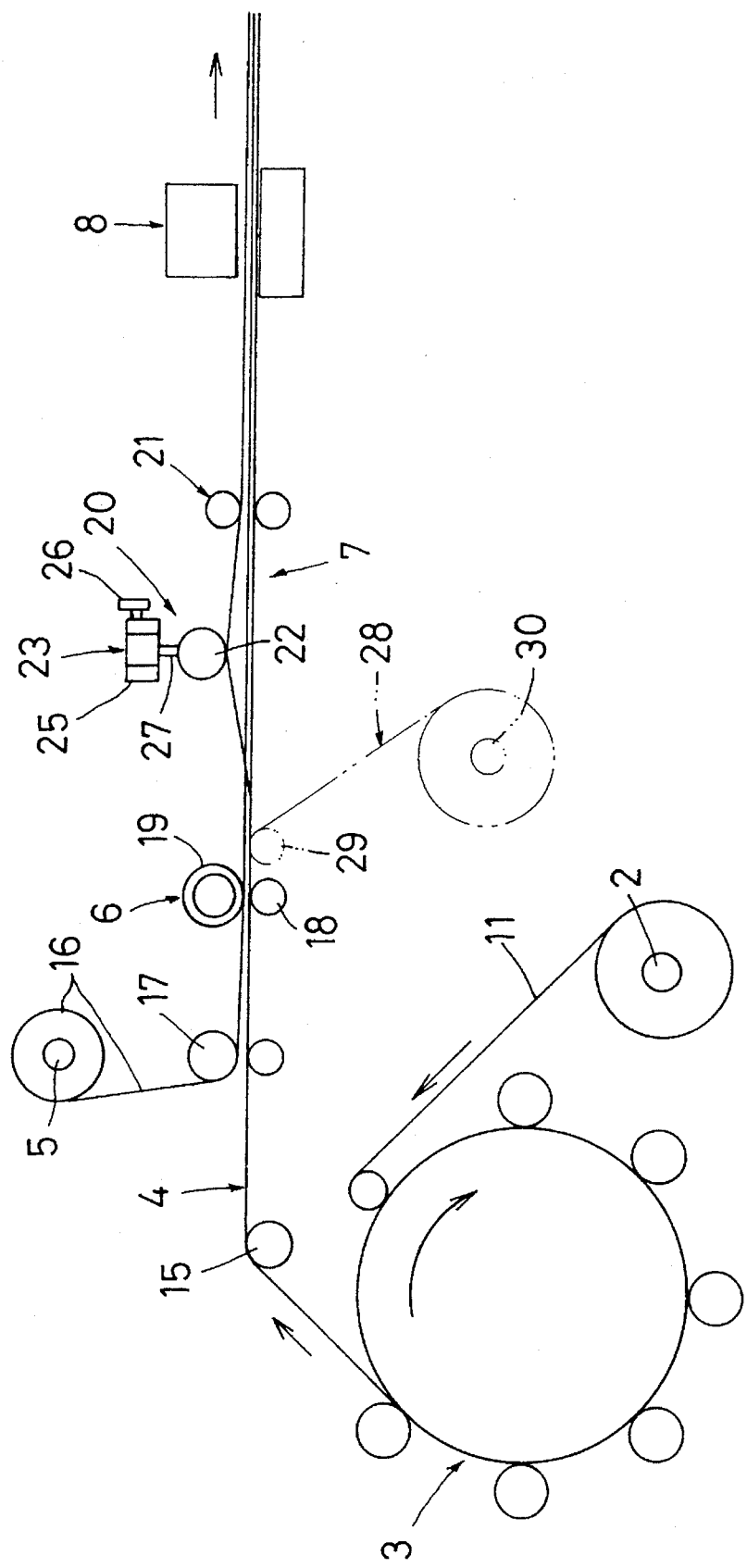
FIG. 1 is a side elevation of a multilayered label manufacturing system.
Figure 2:
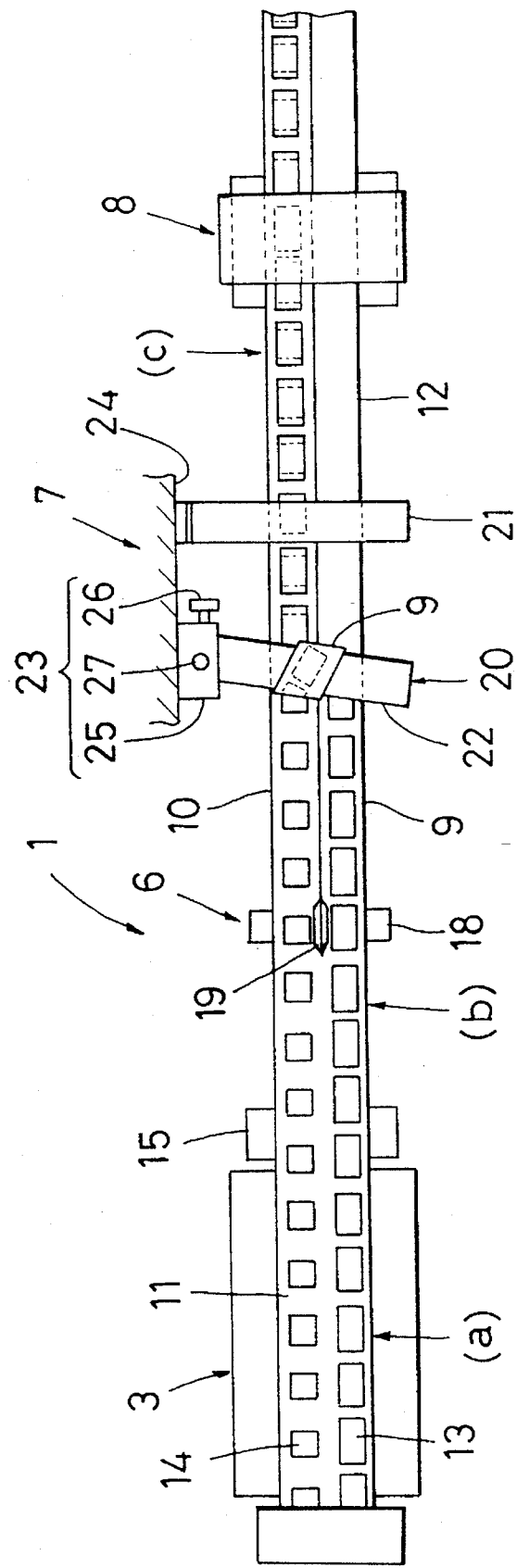
FIG. 2 is a plan view thereof.

FIGS. 1 and 2 illustrate a multilayered label manufacturing system 1. The manufacturing system 1 comprises, successively from the upstream to the downstream side of a conveyance line, a delivery roll 2, a printer 3, a conveyor 4, a film reel 5, a cutter means 6, a superposing apparatus 7 according to the present invention, and a punching means 8.

Wound around the delivery roll 2 is an elongated strip-like double label paper 11 comprising a first label paper 9 and a second label paper 10 which are rendered integral with each other and which will be described later. A release paper 12 is affixed releasably to the reverse surface of the double label paper 11 and both papers are together wound around the delivery roll 2.

Figure 3A:
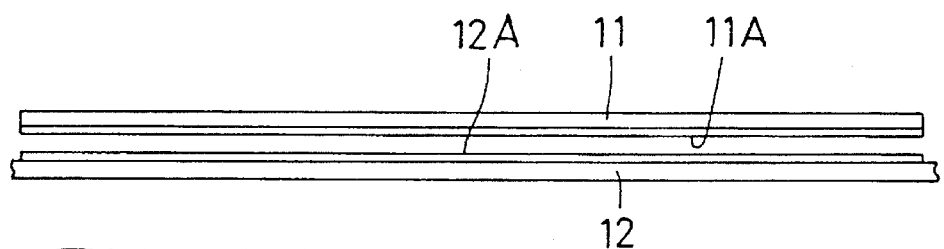
FIG. 3(a) is a side elevation of a label paper and a release paper as seen in the direction of arrow (a) in FIG. 2.

As shown in FIG. 3(a), silicone 12A is applied to the surface of the release paper 12, while an adhesive 11A is applied to the reverse surface of the double label paper 11.

The double label paper 11 with release paper 12 which is delivered from the delivery roll 2 is fed to the printer 3 having a plurality of printing rolls arranged around a drum and, by means of the printer 3, different label messages 13 and 14 are printed on the surface of the double label paper 11 in multicolor, in two rows, and side by side in the transverse direction. The label messages 13 and 14 are arranged left and right in the respective same longitudinal positions at predetermined intervals on the double label paper 11 and carry different pieces of information.

The double label paper 11 after printing is conveyed longitudinally from the upstream to the downstream side by-means of the conveyor 4. The conveyor 4 is provided with a support roller 15 disposed above the printer 3 and another roller (not shown) disposed downstream of the punching means 8.

A transparent laminate film 16 for covering the upper surface of the double label paper 11 to protect the label messages 13 and 14 is wound around the film reel 5. The film reel 5 is disposed just above the conveyance line of the conveyor 4 and it supplies the laminate film 16 to the upper surface of the double label paper 11 after printing. The laminate film 16 which has been fed onto the upper surface of the double label paper 11 is stuck on the paper 11 by means of a film roller 17.

Figure 3B:
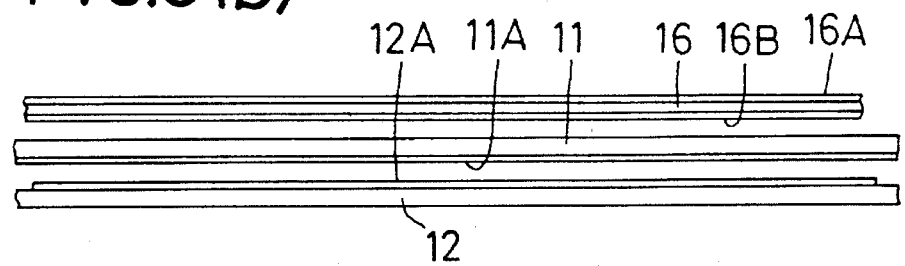
FIG. 3(b) is a side elevation of a label paper and a release paper as seen in the direction of arrow (b) in FIG. 2.

As shown in FIG. 3(b), silicone 16A is applied to the upper surface of the laminate film 16 and an adhesive 16B applied to the underside thereof. Although in this embodiment the laminate film 16 is stuck on only one side (the portion corresponding to the second label paper 10) of the double label paper 11, it may be affixed to the whole upper surface of the double label paper.

The cutter means 6, which is positioned downstream of the film roller 17, comprises a back-up roller 18 for supporting the double label paper 11 with release paper 12 from below and a cutter blade 19 positioned just above the back-up roller 18. The cutter blade 19 is disposed centrally in the transverse direction of the paper conveying line to cut the center in the transverse direction of both double label paper 11 and release paper 12. By this cutting, the double label paper 11 with release paper 12 is divided into the first label paper 9 with release paper 12 located on the right-hand side of the line and the second label paper 10 with release paper 12 located on the left-hand side of the line.

In the case of an embodiment wherein the first label paper 9 free of the release paper 12 is transferred to the adjacent row, the double label paper 11 alone may be cut without cutting the release paper 12. As the cutter means 6 there may be adopted a rotary die cutter having a ring-shaped cutter blade integrally on the peripheral surface of a back-up roller.

The first and second label papers 9, 10 thus resulting from the cutting are further conveyed from the upstream to the downstream side in two rows and side by side in the transverse direction by means of the conveyor 4.

The superposing apparatus 7 used in this embodiment, which is for transferring only the first label paper 9 in an instant to the row of the second label paper 10 with release paper 12, is provided with a transfer means 20 for looping the first label paper 9 in a manner to describe a spiral whose axis extends in a direction intersecting the longitudinal direction (same as the flow direction of the conveyance line) of the first label paper and thereby transferring the first label paper 9 to the row of the second label paper 10, and an adhering means 21 for adhering together both label papers 9 and 10 which have thus been rearranged into a single row by the transfer means 20.

The transfer means 20 includes a cylindrical winding rod 22 whose axis extends in a direction intersecting the longitudinal direction of both label papers 9 and 10. In this embodiment, the winding rod 22 is disposed above the conveyance line, that is, on the surface side of both label papers 9 and 10 and is attached in a rotation-prevented manner to a wall 24 located sideways of the conveyance line.

In this embodiment, therefore, the first label paper 9 is wound spirally round the winding rod 22 while the surface thereof is in contact with the peripheral surface of the winding rod, and is thereafter transferred onto the upper surface of the second label paper 10, as shown in FIG. 2.

Thus, in this embodiment, since the surface of the first label paper 9 comes into contact with the peripheral surface of the winding rod 22, the peripheral surface of the winding rod is subjected to polishing to prevent the surface of the first label paper 9 from being flawed.

On the other hand, the transfer means 20 has an angle adjusting mechanism 23 for adjusting the crossing angle of the winding rod 22 with respect to the longitudinal direction of both label papers 9 and 10.

The angle adjusting mechanism 23 is provided with a casing 25 for supporting in a cantilevered condition the winding rod 22 fixed to a side face of the wall 24, and an adjusting screw 26 inserted rotatably into the casing 25. The winding rod 22 is connected to the casing 25 horizontally pivotably through a vertical pin 27, wherein the pin 27 is mechanically connected with the adjusting screw 26 through a worm gear mechanism disposed within the casing 25.

According to this construction, when the adjusting screw 26 is turned, the winding rod 22 pivotably moves horizontally through the worm gear mechanism, whereby the crossing angle thereof relative to the above longitudinal direction is changed. Therefore, even in the case where both label papers 9 and 10 are changed in width, a highly accurate superposition of both papers is maintained by adjusting the angle of the winding rod 22 to change the spiral center of the label.

The adhering means 21 comprises a pair of upper and lower pinch rollers and it holds, between its pinch rollers from above and below, the first label paper 9 and the second label paper 10 with the release paper 12 which are superposed into a single row by the winding rod 22, to adhere both label papers with each other.

The label papers 9, 10 and the release paper 12 which have passed through the superposing apparatus 7 are fed as they are to the punching means 8 located on the downstream side. The punching means 8 comprises an upper mold and a lower mold and it punches out the portions of the label messages 13 and 14 from both label papers 9 and 10 which have been conveyed to between the upper and lower molds and superposed together, to obtain multilayered labels.

Downstream of the punching means 8 is disposed a take-up reel (not shown) to wind up thereon the label papers 9, 10 and release paper 12 which have become unnecessary after the punching operation.

Figure 3C:
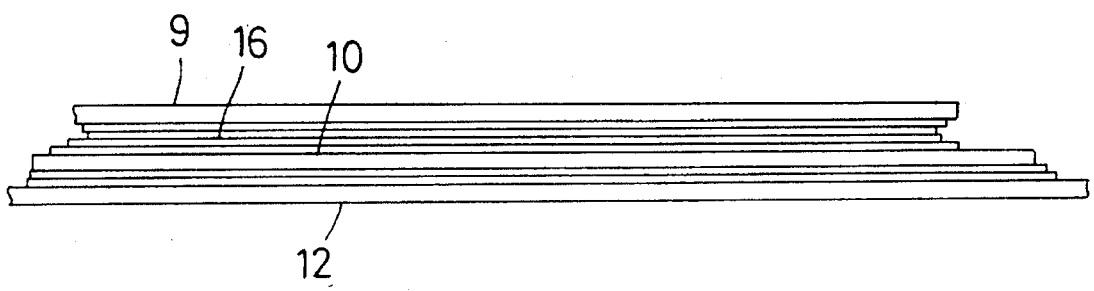
FIG. 3(c) is a side elevation of a label paper and a release paper as seen in the direction of arrow (c).

FIG. 3(a)–3(c) are side elevation views showing a superposed relation of label papers and release paper in each multilayered label manufacturing step. The symbols (a), (b) and (c) affixed to the same figure correspond to the positions indicated by the same symbols in FIG. 2.

As illustrated in FIG. 3, the laminate film 16 is stuck on the upper surface (FIG. 3(b)) of the double label paper 11 with release paper 12 (FIG. 3(a)) which has just left the printer 3. Thereafter, the release paper 12 and the double label paper 11 with film 16 are cut right and left and thereby divided into first and second label papers 9, 10, which are fed to the superposing apparatus 7. In the superposing apparatus 7, as shown in FIG. 4, only the first label paper 9 is wound around the winding rod 22 and transferred to the row of the second label paper 10 while being separated from the release paper 12. Both label papers 9 and 10 are then superposed and adhered together into a single row by the adhering means 21 (FIG. 3(c)).

In the case where the winding rod 22 is disposed on the surface side of both label papers 9 and 10 (above the conveyance line) as in this embodiment, the first label paper 9 can be separated from the release paper 12 simultaneously with its looping, as shown in FIG. 4, so it is no longer required to separately provide a special roller for separating the first label paper 9 from the release paper. Also in this respect there can be obtained an advantage that the production line can be simplified.

Also in this embodiment there may be used a removing means 28 for releasing and removing the release paper 12 from the first label paper 9 prior to the looping operation. As indicated by phantom line in FIG. 1, the removing means 28 can be composed of a removing roller 29 for guiding the separated release paper 12 to the exterior of the conveyance line and a take-up reel 30 for winding up the release paper 12, provided it is necessary that the removing means 28 be disposed between the winding rod 22 and the cutter means 6.

Figure 5:
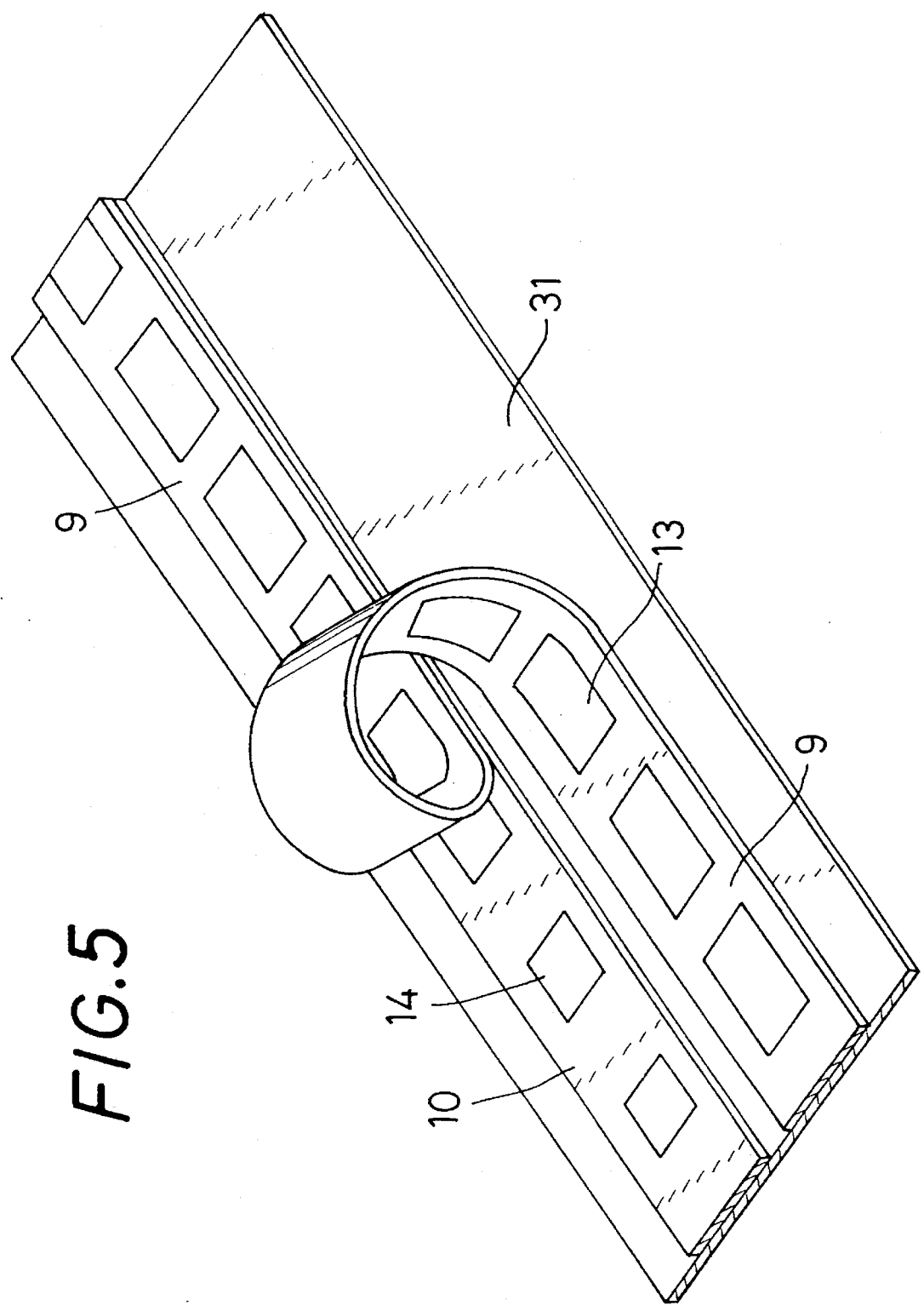
FIG. 5 is a perspective view showing another method of superposing label papers.

In the case where the winding rod 22 is disposed on the surface side of both label papers 9 and 10, as shown in FIG. 5, the first and second label papers 9, 10 may be arranged in rows in parallel with each other on the upper surface of a single common sheet of release paper 31 and in this state may be fed to the printer 3. In this case, the cutter means 6 can be omitted from the conveyance line because both label papers 9 and 10 are in a separated state from the beginning.

Figure 6:
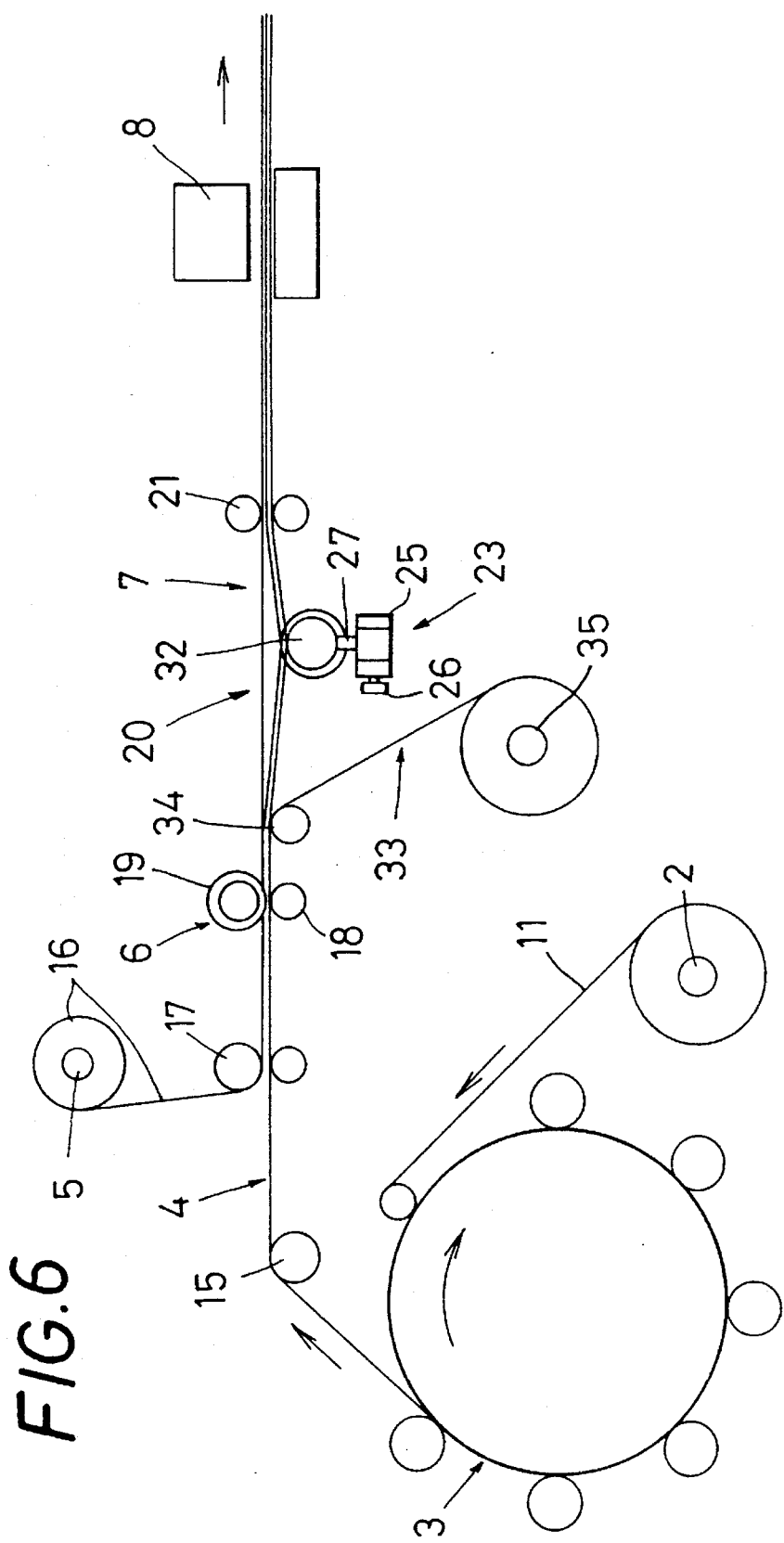
FIG. 6 is a side elevation of a multilayered label manufacturing system.

Referring now to FIGS. 6 and 7, there is illustrated a second embodiment of the present invention.

The greatest difference of this second embodiment from the previous first embodiment resides in that the second label paper 10 with release paper 12 is looped in a manner to describe a spiral and is transferred to the row of the first label paper 9 not having the release paper 12. Other points are almost the same as in the first embodiment. In FIGS. 6 and 7, therefore, the same components as in the first embodiment are indicated by the same reference numerals as in the first embodiment and explanations thereof will be omitted.

In a superposing apparatus 7 according to the second embodiment, a winding rod 32 is disposed on the reverse side (under the conveyance line) of both label papers 9 and 10 so as to spirally wind thereon the second label paper 10 with release paper 12 while allowing the reverse surface of the release paper 12 to come into contact with the peripheral surface of the winding rod.

In the case of transferring the second label paper 10 with release paper 12 to the first label paper 9 side, it is necessary that the release paper 12 to be released from the first label paper prior to the transfer. To this end, a removing means 33 for peeling off the release paper 12 from the first label paper 9 is disposed on the upstream side of the winding rod 32 in this embodiment. The removing means 33 comprises a removing roller 34 for guiding the separated release paper 12 to the exterior of the conveyance line and a take-up reel 35 for winding up the release paper 12.

Also in this embodiment, a cutter means 6 for cutting the double label paper 11 with release paper 12 centrally in the widthwise direction of the double label paper is disposed still upstream of the removing means 33. By this cutting, the double label paper 11 with release paper 12 is separated into the first label paper 9 with release paper 12 and the second label paper 10 with release paper 12.

In the case where a winding rod 22 is disposed on the reverse side of both label papers 9 and 10 as in this embodiment, it is necessary to use the removing means 33 mentioned above, but since the back side of the release paper 12 affixed to the second label paper 10 comes into contact with the peripheral surface of the winding rod 32 as shown in FIG. 6 and 7, there is no fear of damage to the surface of the second label paper 10. Therefore, it is not required to so greatly enhance the processing accuracy for the peripheral surface of the winding rod 32; besides, it is possible to prevent the occurrence of defective products.

The present invention may be practiced in other ways without departing from its essential characteristic matters.

Although applications examples of the present invention for multilayered label manufacturing systems are shown in the illustrated preferred embodiments, if in place of the second label paper 10 an elongated strip member having pamphlets or cards arranged continuously in the longitudinal direction is allowed to flow on the conveyance line together with the first label paper 9 and either the strip member or the first label paper 9 is transferred to the other row by means of the winding rod 22 (32), then the present invention can also be applied to the manufacturing method for pamphlets or cards.

The foregoing embodiments are for purpose of illustration and are not intended to limit the invention. The scope of the present invention is defined by the following claims, and all of embodiments falling under the scope of those claims are included in the invention.

What is claimed is:

1. A method of superposing strip members comprising the steps of:

conveying first and second strip members arranged in two rows and side by side in the widthwise direction thereof in parallel to each other, from an upstream side toward a downstream side in the longitudinal direction thereof, said first and second strip members each including a label paper and a release paper releasably affixed to a reverse surface of said label paper;

looping the label paper of said first strip member around a winding rod in a manner to describe a spiral whose axis extends in a direction intersecting the longitudinal direction of the strip member to be looped, thereby delivering the looped label paper in a row of the second strip member;

releasing said release paper from said first label paper at the same time that said first label paper is looped around said winding rod;

adjusting an intersecting angle of said winding rod relative to the longitudinal direction to thereby change the spiral center of the first strip member; and superposing the first and second strip members thus rearranged into a single row so as to be integrated.

2. The method as defined in claim 1, wherein said first and second label papers are integrally formed from a single label paper on an upstream side in the conveyance direction thereof, said single label paper being cut centrally in its widthwise direction to separate the first label paper from the second label paper prior to performing said looping operation.

3. The method as defined in claim 1, wherein, said release paper is removed to an exterior of a label paper conveyance line.

4. The method as defined in claim 3, wherein said first and second label papers are integrally formed from a single label paper on an upstream side in the conveyance direction thereof, said single label paper being cut centrally in its widthwise direction to separate the first label paper from the second label paper prior to performing said removal of a release paper.

5. The method as defined in claim 1, wherein said first and second label papers are affixed to the upper surface of a single common release paper in parallel with each other.

6. An apparatus for superposing strip members comprising:

a conveyor for conveying first and second strip members arranged in two rows and side by side in the widthwise direction thereof in parallel to each other, from an upstream side toward a downstream side in the longitudinal direction thereof, said first and second strip members including a label paper and a release paper releasably affixed to a reverse surface of said label paper;

a transfer means for looping the label paper of said first strip member in a manner to describe a spiral whose axis extends in a direction intersecting the longitudinal direction of the strip member to be looped, said transfer means also simultaneously stripping the release paper off of said first strip member, thereby delivering the looped label paper of the first strip member to a row of the second strip member;

an angle adjusting mechanism for changing an intersecting angle of said transfer means to the longitudinal direction; and an adhering means for superposing the label paper of the first strip member and the second strip member rearranged into a single row by said transfer means so as to be integrated.

7. The apparatus as defined in claim 6, wherein said first and second label papers are integrally formed from a single label paper on an upstream side in the conveyance direction thereof, a cutter means being provided on an upstream side of said transfer means for cutting said single label paper centrally in its widthwise direction to separate the first label paper from the second label paper.

8. The apparatus as defined in claim 6, wherein said release paper from the first label paper is moved to an exterior of a label paper conveyance line.

9. The apparatus as defined in claim 8, wherein said first and second label papers are integrally formed from a single label paper on an upstream side in the conveyance direction thereof, a cutter means being provided on an upstream side of said transfer means for cutting said single label paper centrally in its widthwise direction to separate the first label paper from the second label paper.

10. The apparatus as defined in claim 6, wherein said first and second label papers are affixed to the upper surface of a single common release paper in parallel with each other.

11. The apparatus as defined in any of claims 7, 8, 9, or 10, wherein said transfer means comprises a cylindrical rod unrotatable about an axis thereof, the peripheral surface thereof being subjected to polishing.

* * * * *